(12) United States Patent
Alexander et al.

(10) Patent No.: US 10,244,892 B2
(45) Date of Patent: Apr. 2, 2019

(54) LIQUID CONTAINER AND MODULE FOR ADJUSTING TEMPERATURE OF LIQUID IN CONTAINER

(71) Applicant: Ember Technologies, Inc., Westlake Village, CA (US)

(72) Inventors: Clayton Alexander, Westlake Village, CA (US); Christopher Thomas Wakeham, Solana Beach, CA (US); Daren John Leith, Agoura Hills, CA (US); Mikko Juhani Timperi, San Marcos, CA (US)

(73) Assignee: Ember Technologies, Inc., Westlake Village, CA (US)

(*) Notice: Subject to any disclaimer, the term of this patent is extended or adjusted under 35 U.S.C. 154(b) by 70 days.

(21) Appl. No.: 15/442,304

(22) Filed: Feb. 24, 2017

(65) Prior Publication Data

US 2017/0245678 A1     Aug. 31, 2017

Related U.S. Application Data

(60) Provisional application No. 62/301,083, filed on Feb. 29, 2016.

(51) Int. Cl.
*A61J 9/00* (2006.01)
*H05B 3/78* (2006.01)
(Continued)

(52) U.S. Cl.
CPC ........... *A47J 36/2411* (2013.01); *A47G 23/04* (2013.01); *A47J 36/2416* (2013.01);
(Continued)

(58) Field of Classification Search
USPC ........................................ 392/341, 444, 448
See application file for complete search history.

(56) References Cited

U.S. PATENT DOCUMENTS 1,727,913 A * 9/1929 Svenn ...................... H05B 3/78
219/523
2,483,979 A * 10/1949 Morrill ............... A47J 36/2433
215/11.1
(Continued)

FOREIGN PATENT DOCUMENTS

| CN | 2708795 Y | 7/2005 |
|---|---|---|
| CN | 2803209 Y | 8/2006 |

(Continued)

OTHER PUBLICATIONS

PCT International Search Report and Written Opinion, PCT/US2017/018960, dated May 22, 2017, Applicant: Ember Technologies, Inc. 22 pp.
(Continued)

*Primary Examiner* — Thor S Campbell
(74) *Attorney, Agent, or Firm* — Knobbe, Martens, Olson & Bear LLP

(57) ABSTRACT

A module for adjusting a temperature of a liquid in a container can include an elongate portion sized for insertion into the container, the elongate portion having an outer surface that contacts the liquid in the container about its circumference, the elongate portion housing therein one or more heating or cooling elements operable to facilitate heat transfer between at least a portion of the elongate portion and the liquid in the container. An adaptor attached to a proximal end of the elongate portion has a rim and a circumferential wall that have an outer circumference greater than an outer circumference of the elongate portion, the adaptor defining one or more passages between the circumferential wall and the outer surface of the elongate portion. The adaptor can be coupled to an opening of the container such that the elongate portion is suspended in the container and so that at least a portion of the elongate portion is submerged in the liquid in the container. The one or more
(Continued)

passages allow the liquid to exit the vessel while the elongate portion is disposed in the container, allowing a user to consume the liquid in the container while the module is disposed in the container. A plurality of adaptors of varying sizes can be provided to allow use of the module with containers of varying sizes.

29 Claims, 10 Drawing Sheets

(51) Int. Cl.
  *F24H 1/20* (2006.01)
  *A47G 23/04* (2006.01)
  *A47J 36/24* (2006.01)
  *A61J 11/00* (2006.01)
  *F24H 1/18* (2006.01)

(52) U.S. Cl.
  CPC ............ *A47J 36/2433* (2013.01); *A61J 9/00* (2013.01); *A61J 11/008* (2013.01); *H05B 3/78* (2013.01)

(56) References Cited

U.S. PATENT DOCUMENTS

| | | | |
|---|---|---|---|
| 2,548,076 A * | 4/1951 | Strezoff | A47J 41/005 |
| | | | 219/527 |
| 2,746,265 A * | 5/1956 | Mills | B65D 51/24 |
| | | | 62/293 |
| 2,896,607 A | 7/1959 | Eder | |
| 3,064,113 A | 11/1962 | Mani | |
| 3,536,893 A * | 10/1970 | Cranley | H05B 3/80 |
| | | | 219/437 |
| 3,757,085 A * | 9/1973 | Balaguer | H05B 3/00 |
| | | | 219/386 |
| 3,874,365 A | 4/1975 | Thurman | |
| 3,892,945 A | 7/1975 | Lerner | |
| 3,931,494 A * | 1/1976 | Fisher | A47J 36/2461 |
| | | | 219/441 |
| 4,801,782 A | 1/1989 | Ineson | |
| 5,208,896 A | 5/1993 | Katayev | |
| 5,388,565 A | 2/1995 | Ou | |
| 5,842,353 A | 12/1998 | Kuo-liang | |
| 6,013,901 A | 1/2000 | Lavoie | |
| 6,032,481 A | 3/2000 | Mosby | |
| 6,072,161 A | 6/2000 | Stein | |
| 6,110,159 A | 8/2000 | Tsujita | |
| 6,123,065 A | 9/2000 | Teglbjarg | |
| 6,140,614 A | 10/2000 | Padamsee | |
| 6,178,753 B1 * | 1/2001 | Scudder | A47J 36/28 |
| | | | 126/263.08 |
| 6,310,329 B1 | 10/2001 | Carter | |
| 6,314,867 B1 | 11/2001 | Russell | |
| 6,415,624 B1 | 7/2002 | Connors et al. | |
| 6,427,863 B1 | 8/2002 | Nichols | |
| 6,571,564 B2 | 6/2003 | Upadhye et al. | |
| 6,674,052 B1 | 1/2004 | Luo | |
| 6,703,590 B1 | 3/2004 | Holley, Jr. | |
| 6,864,462 B2 | 3/2005 | Sanoner et al. | |
| 7,002,111 B2 | 2/2006 | Bauer | |
| 7,059,387 B2 | 6/2006 | Kolowich | |
| 7,069,739 B2 * | 7/2006 | Porter | F25D 31/007 |
| | | | 126/262 |
| 7,117,684 B2 * | 10/2006 | Scudder | F25D 5/02 |
| | | | 62/4 |
| 7,263,283 B2 | 8/2007 | Knepler | |
| 7,287,386 B2 | 10/2007 | Upadhye et al. | |
| 7,552,673 B2 | 6/2009 | Levin | |
| 7,802,446 B2 * | 9/2010 | Overgaard | B65D 23/065 |
| | | | 62/457.3 |
| 7,942,145 B2 | 5/2011 | Palena et al. | |
| 8,113,365 B2 * | 2/2012 | Brown | A61J 9/04 |
| | | | 215/11.1 |
| 8,274,016 B2 | 9/2012 | Montana | |
| 8,319,154 B2 | 11/2012 | Shaikh et al. | |
| D715,143 S * | 10/2014 | Hewitt | D9/436 |
| 9,021,825 B2 * | 5/2015 | Hewitt | F25D 3/08 |
| | | | 62/293 |
| 9,138,097 B2 | 9/2015 | Driel et al. | |
| 9,351,600 B2 | 5/2016 | Rime | |
| 9,480,363 B2 | 11/2016 | Delattre | |
| 9,713,798 B2 * | 7/2017 | Hewitt | B65D 81/18 |
| 9,802,806 B2 * | 10/2017 | Hewitt | F25D 3/08 |
| 2001/0022304 A1 | 9/2001 | Roche | |
| 2006/0081599 A1 | 4/2006 | Anderson | |
| 2006/0173259 A1 | 8/2006 | Flaherty | |
| 2006/0209628 A1 | 9/2006 | Jones | |
| 2007/0223895 A1 | 9/2007 | Flemm | |
| 2007/0279002 A1 | 12/2007 | Partovi | |
| 2008/0041859 A1 | 2/2008 | Teglbjarg | |
| 2008/0149624 A1 | 6/2008 | Hikaru | |
| 2008/0179311 A1 | 7/2008 | Koro et al. | |
| 2009/0071952 A1 | 3/2009 | Kuwabara | |
| 2009/0283533 A1 | 11/2009 | Hemminger et al. | |
| 2009/0285570 A1 | 11/2009 | Yeh | |
| 2010/0000980 A1 | 1/2010 | Popescu | |
| 2011/0062149 A1 | 3/2011 | Driel | |
| 2011/0070474 A1 | 3/2011 | Lee et al. | |
| 2011/0162532 A1 | 7/2011 | Gilbert | |
| 2012/0064470 A1 | 3/2012 | Delattre et al. | |
| 2012/0103562 A1 | 5/2012 | Alexander | |
| 2013/0059259 A1 | 3/2013 | Oldani | |
| 2013/0200064 A1 | 8/2013 | Alexander | |
| 2013/0206015 A1 | 8/2013 | Jacoby | |
| 2013/0255824 A1 | 10/2013 | Williams et al. | |
| 2014/0305927 A1 | 10/2014 | Alexander | |
| 2015/0122688 A1 | 5/2015 | Dias | |
| 2015/0230651 A1 | 8/2015 | Molayem | |
| 2016/0045047 A1 | 2/2016 | Healy | |

FOREIGN PATENT DOCUMENTS

| | | |
|---|---|---|
| CN | 2922666 Y | 7/2007 |
| CN | 101069606 A | 11/2007 |
| CN | 201042350 Y | 4/2008 |
| CN | 201612420 U | 10/2010 |
| GB | 2414922 A | 12/2005 |
| JP | S43 22460 Y1 | 9/1968 |
| JP | S53 135151 U | 10/1978 |
| JP | H05-306472 A | 11/1993 |
| JP | 2005-308353 A | 11/2005 |
| JP | U 3153007 B | 8/2009 |
| JP | 2012-523085 A | 9/2012 |
| WO | WO 2008/155538 A2 | 12/2008 |
| WO | WO 2013/096136 | 6/2013 |
| WO | WO 2016/193480 A1 | 12/2016 |

OTHER PUBLICATIONS

Second Office Action dated Apr. 10, 2017 in CN Application No. 201510869257.5.
Office Action dated Jan. 12, 2018, received in Chinese Application No. 201510869257.5.
PCT International Search Report and Written Opinion, dated Sep. 24, 2018, regarding International Application No. PCT/US2018/036911, 14 pages.
Office Action dated Sep. 4, 2018 regarding Japan Patent Application No. 2017-554610, 10 pages.

* cited by examiner

LIQUID CONTAINER AND MODULE FOR ADJUSTING TEMPERATURE OF LIQUID IN CONTAINER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Application No. 62/301,083, filed Feb. 29, 2016, the entire contents of which are hereby incorporated by reference and should be considered a part of this specification. This application is related to U.S. application Ser. No. 14/712,313, filed May 14, 2015, the entire contents of all of which are hereby incorporated by reference and should be considered a part of this specification.

BACKGROUND

Field of the Invention

The present invention is directed to a liquid container, and more particularly to a module for adjusting the temperature (e.g., heating and/or cooling) of a liquid in the container.

Description of the Related Art

Systems for heating liquid while in containers exist in the art. However, such systems usually require the removal of the unit from the container prior to consumption of the liquid in the container, or require that the container be attached to a power unit while the heater is being operated, both of which are inconvenient. Other systems include heaters that are generally planar and heat only liquid in contact with the planar surface. Still other systems do not allow for active control of the heating process.

SUMMARY

There is a need for an improved module for heating or cooling liquid in a container (such as a baby bottle or sippy cup) that is easy to use and that can communicate with electronics (e.g., smartphones) to allow easy operation of the module and collection of information related to the consumption of the liquid. Additionally there is a need for a module that can be used with a variety of existing containers, including preexisting containers that users already have, thereby allowing users to use their container of choice with the module.

In accordance with one aspect, a module for adjusting a temperature of a liquid in a container is provided. The module comprises an elongate portion sized for insertion into a container configured to hold a liquid, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container. The module also comprises an adaptor attached to a proximal end of the elongate portion, the adaptor having a rim and a circumferential wall that each have an outer circumference greater than an outer circumference of the elongate portion, the adaptor defining one or more passages between the circumferential wall and the outer surface of the elongate portion. The adaptor is configured to couple to an opening of the container such that the elongate portion extends into the container so that at least a portion of the elongate portion is submerged in the liquid in the container, the one or more passages configured to allow the liquid to exit the vessel while the module is disposed in the container, thereby allowing a user to consume the liquid in the container while the module is disposed in the container.

In accordance with another aspect, the combination of a container configured to hold a liquid and a module for adjusting a temperature of a liquid in a container is provided. An elongate portion is sized for insertion into the container such that the elongate portion is suspended in a cavity of the container, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container. An adaptor is attached to a proximal end of the elongate portion, the adaptor having a rim and a circumferential wall that each have an outer circumference greater than an outer circumference of the elongate portion, the adaptor defining one or more passages between the circumferential wall and the outer surface of the elongate portion. The adaptor is configured to couple to an opening of the container such that the elongate portion extends into the container so that at least a portion of the elongate portion is submerged in the liquid in the container, the one or more passages configured to allow the liquid to exit the vessel while the module is disposed in the container, thereby allowing a user to consume the liquid in the container while the module is disposed in the container.

In accordance with another aspect, a kit for heating or cooling a liquid in a container is provided. The kit comprises an elongate portion sized for insertion into the container, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container. The kit also comprises one or more adaptors removably coupleable to a proximal end of the elongate portion, the adaptor having a rim and a circumferential wall that each have an outer circumference greater than an outer circumference of the elongate portion, said circumference of the rim and circumferential wall being sized to fit an opening of the container, the adaptor defining one or more passages between the circumferential wall and the outer surface of the elongate portion to allow the liquid in the container to exit via said one or more passages while the elongate portion is disposed in the container during consumption of the liquid by the user.

DETAILED DESCRIPTION

Figure 1:
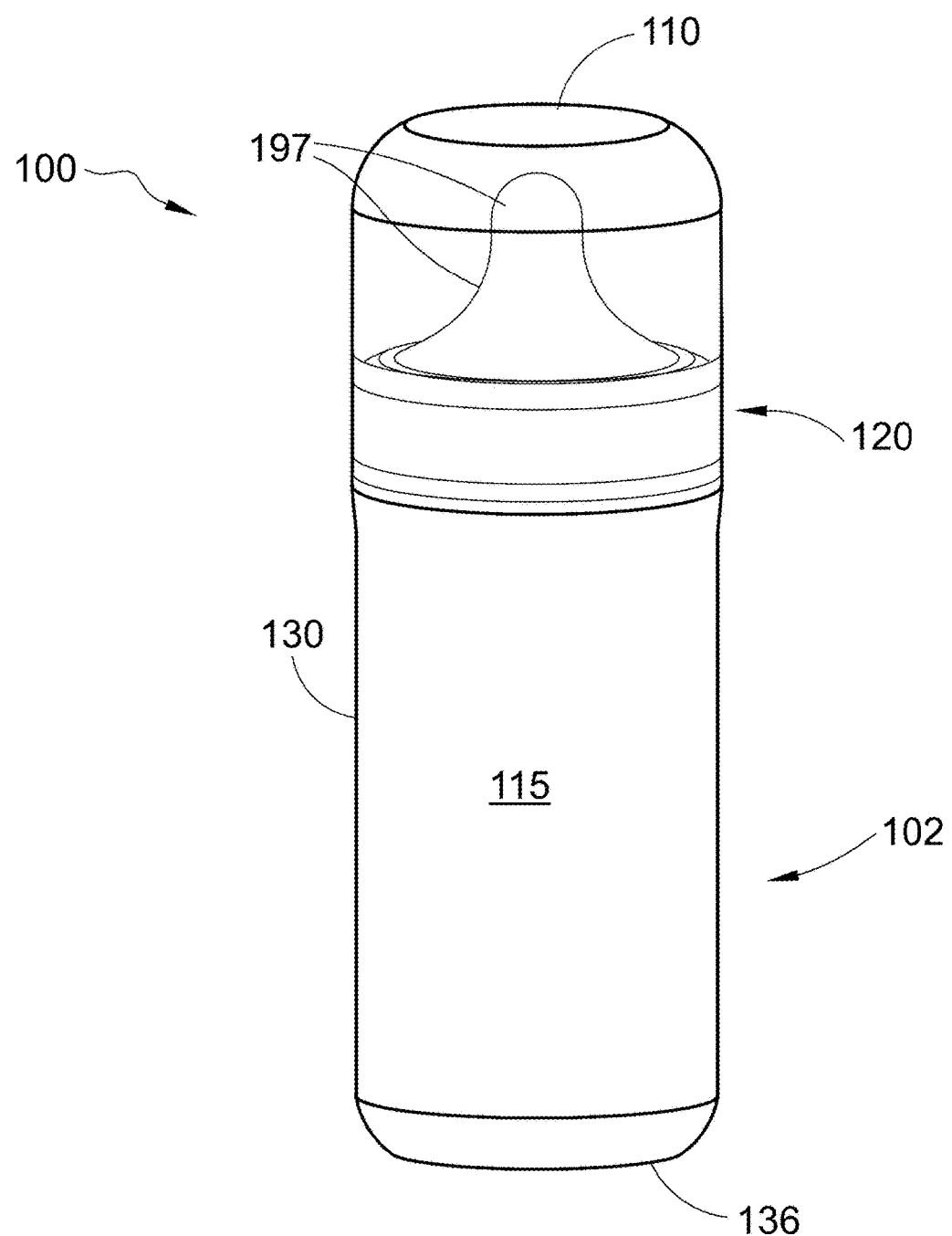
FIG. 1 shows a perspective view of an embodiment of a container assembly.

FIG. 1 illustrates an embodiment of a container assembly 100 (hereinafter "container 100"). In the illustrated embodiment, the container assembly 100 includes a vessel 102 in the form of a baby or infant bottle. However, the vessel 102 can have other forms, such as a sippy cup, a travel mug (e.g., for coffee, tea, etc.), a soup container, a thermos container, a jar, a water bottle (e.g., reusable water bottle). In one embodiment, the vessel 102 can be a preexisting (e.g., conventional) vessel already in the user's possession (e.g., a vessel in the user's kitchen cabinet). The vessel 102 can hold a liquid therein.

In the illustrated embodiment, the vessel 102 has an outer wall 130 and bottom wall 136 that define a chamber 115 therebetween for holding a liquid (e.g., milk). The vessel 102 can be made of plastic, glass, metal or other conventional material used for liquid containers. A cap or lid 120 can couple to the top of the vessel 102 (e.g., coupled via corresponding threads between the cap 120 and the top of the vessel 102). With reference to FIG. 1, a connector 197 can optionally be held in place on top of the vessel 102 by the cap 120. In the illustrated embodiment, the connector 197 can be a nipple (e.g., made of rubber, silicone, or other common material used in baby bottle nipples). In another embodiment, the connector 197 can be similar to a drinking spout in a sippy cup. In still another embodiment, the connector 197 can be excluded, and the cap 120 can have an opening or spout through which the liquid can exit the vessel 102. In yet another embodiment, the cap 197 can completely close the top of the vessel 102, such that the cap 197 is removed before liquid can be poured from the vessel 102.

Figure 2:
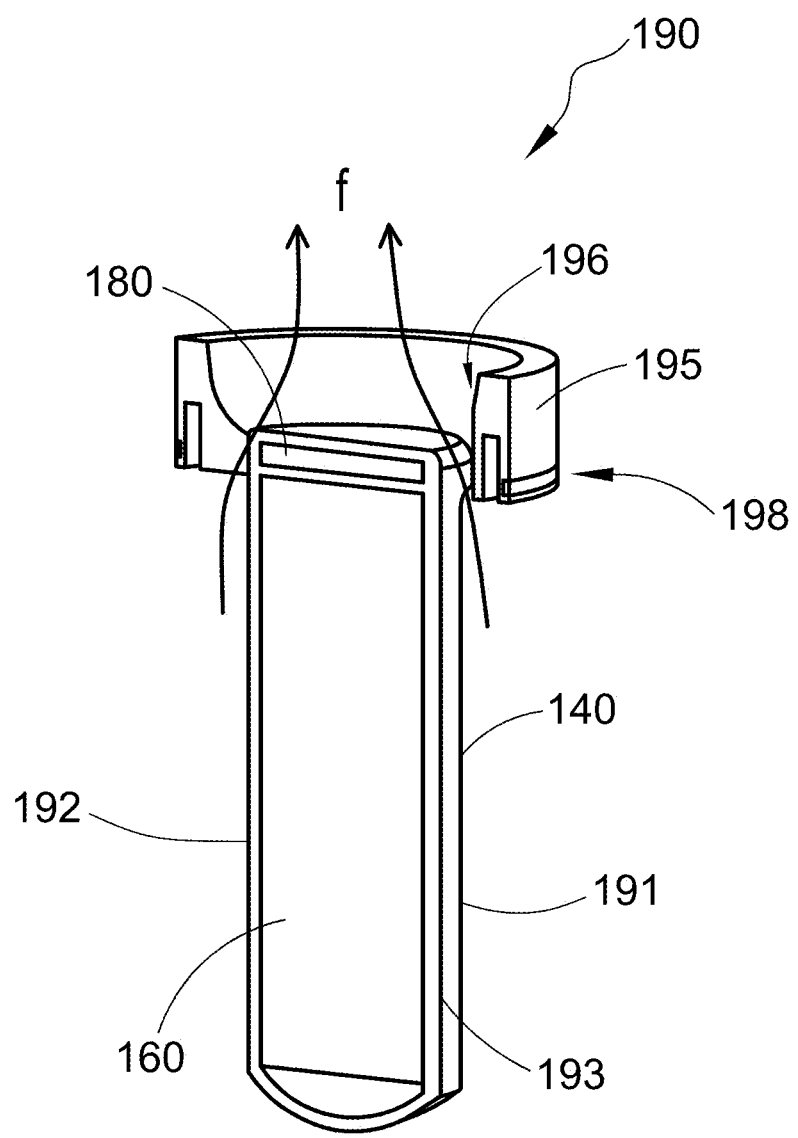
FIG. 2 shows a cross-sectional view of an embodiment of a removable heating unit for use with a container, such as the container in FIG. 1.
Figure 3A:
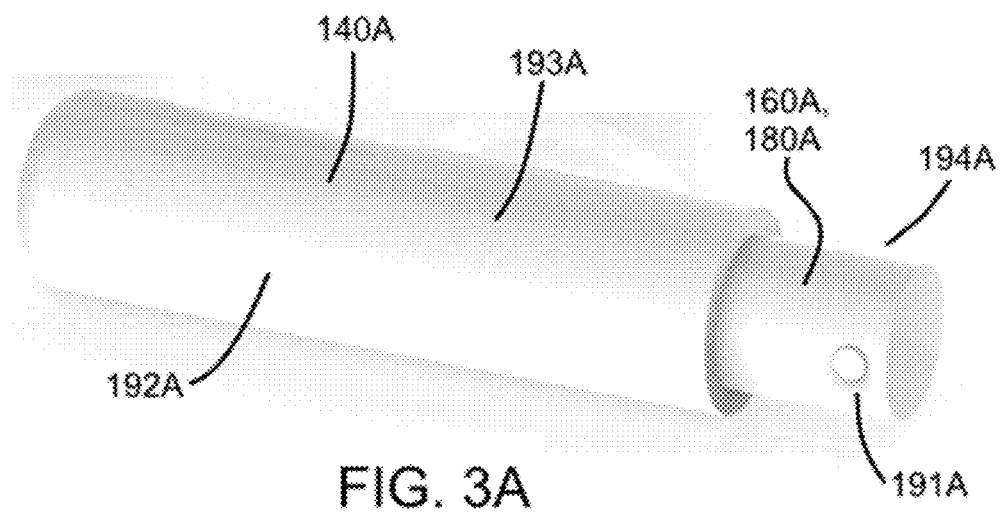
FIG. 3A shows a perspective view of an embodiment of a removable heating unit for use with a container, such as the container in FIG. 1.
Figure 3B:
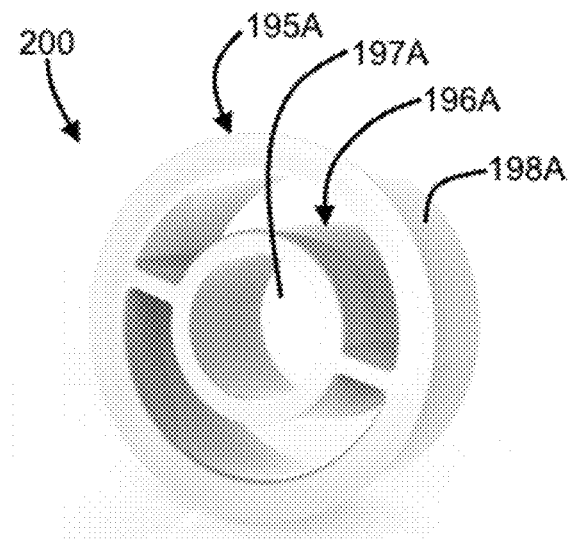
FIG. 3B shows a perspective view of an embodiment of an adaptor for use with the removable heating unit of FIG. 3A.
Figure 3C:
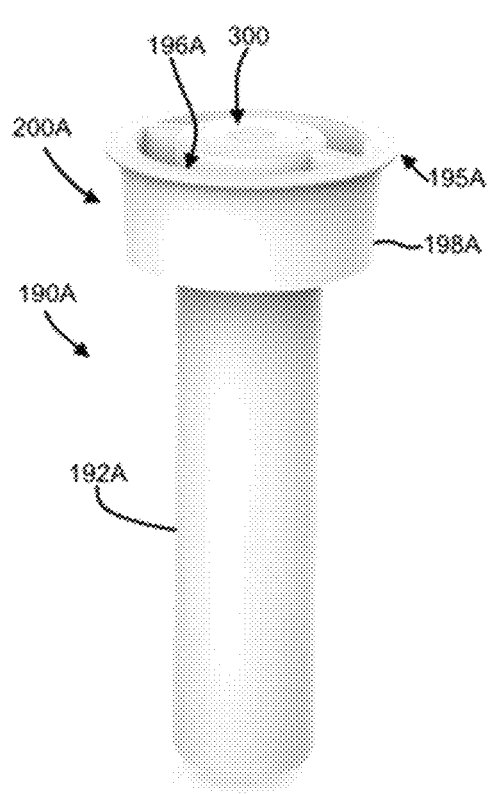
FIG. 3C shows a front perspective view of the adaptor of FIG. 3B coupled to the heating unit of FIG. 3A to provide a heating unit assembly.
Figure 3D:
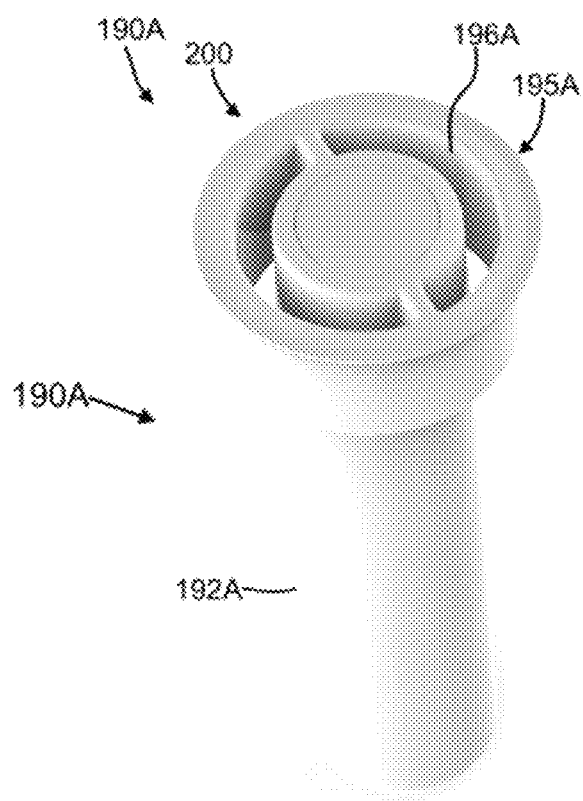
FIG. 3D shows a top perspective view of the heating unit assembly of FIG. 3C.
Figure 4A:
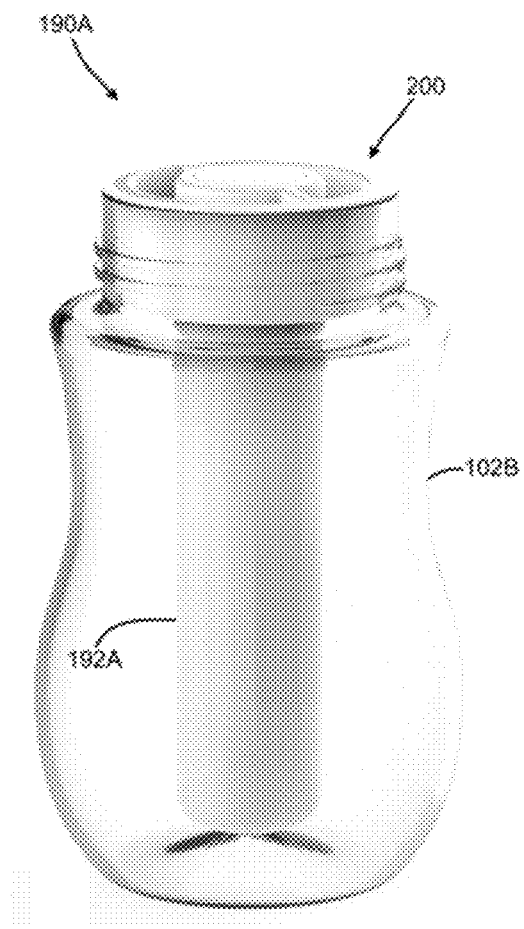
FIG. 4A shows a front perspective view of the removable heating unit assembly of FIG. 3C coupled to one embodiment of a container.
Figure 4B:
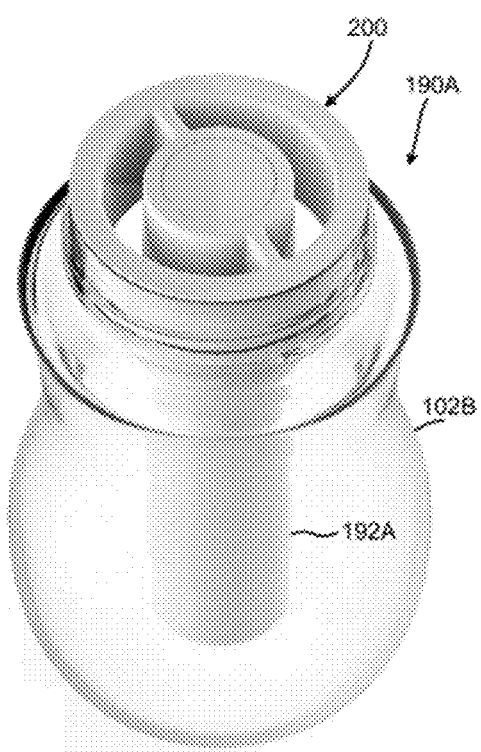
FIG. 4B shows a top perspective view of the removable heating unit assembly of FIG. 3C coupled to the container of FIG. 4A.
Figures 5A, 5B:
FIG. 5A shows a front perspective view of the removable heating unit assembly of FIG. 3C coupled to one embodiment of a container.
FIG. 5B shows a top perspective view of the removable heating unit assembly of FIG. 3C coupled to the container of FIG. 5A.

With reference to FIG. 2, the container assembly 100 can include a heating unit or module 190 removably insertable into the vessel 102 and held in place by the cap 120. The module 190 can have an elongate body 192. In one embodiment, the body 192 is optionally cylindrical and is removably insertable into the vessel 102 such that the body 192 is suspended within the chamber 115 spaced from the wall 130 of the vessel 102, and so that at least a portion of the body 192 is submerged within the liquid in the vessel 102 and in contact with liquid about the circumference of the body 192 (e.g., so that the heating unit or module 190 can heat the liquid in the vessel 102 along 360 degrees), which advantageously results in more efficient and uniform heating (or cooling, if using cooling elements as discussed below) of the liquid in the chamber 115. However, in other embodiments, the body 192 is not cylindrical, and can have other suitable shapes (e.g., an oval, square or rectangular transverse cross-section).

In one embodiment, the module 190 can optionally have one or more sensors 193, and at least one heating element 140. The one or more sensors 193 can be one or more of a temperature sensor, a liquid level sensor, a capacitance sensor used to determine liquid level or temperature, a pH sensor, an ultrasonic sensor, a tilt sensor such as a gyroscope to sense an angular orientation of the module 190 and therefore the vessel 102, and an accelerometer. In one embodiment, the sensor 193 is a strip that extends along at least a portion of the length of the module 190. The module 190, when disposed within the chamber 115, can be selectively operated to heat the liquid in the chamber 115. In one embodiment, the at least one heating element 140 can be automatically activated as soon as it's inserted into the chamber 115 (e.g., by sensing contact with a liquid. Alternatively, the heating element 140 can be activated based on user action, as discussed further below, or user input (e.g., via an interface of the module 190 or wirelessly from a remote electronic device, such as a smartphone or tablet computer using an app, or via the internet with a remote computer). In one embodiment, the one or more heating elements 140 can be one or more resistive heaters, such as a resistive coil heater. Though the discussion in this paragraph refers to one or more heating elements 140, one of skill in the art will recognize that this can also apply to one or more cooling elements or one or more heating or cooling elements (e.g., thermoelectric elements), and that this disclosure is meant to apply to all these options for the container 100. In another embodiment, the one or more heating elements 140 is a phase change material (PCM) contained within the body 192 that releases heat energy to the liquid in the chamber 115 to heat the liquid up to a transition temperature defined by the phase change material type.

The module 190 can optionally further have one or more power storage elements 160 and a control circuitry 180. With continued reference to FIG. 2, the module 190 can include a rim portion 195 that is wider (e.g., is defined by a larger radius) than the body 192. The rim portion 195 can rest on the rim (not shown) of the vessel 102 when in use (e.g., when the body 192 is inserted into the chamber 115). In one embodiment, the module 190 can include charging contacts 198 that can contact corresponding electrical contacts on a charging assembly (not shown), when the module 190 is not in use, to charge the power storage elements 160. In the embodiment shown in FIG. 2, the charging contacts 198 are optionally on the rim 195. In another embodiment, the charging contacts can be on a portion of the body 192 (e.g., a top portion of the body 192).

The one or more heating elements 140 (or cooling elements or cooling/heating elements) and optional power storage elements 160 and control circuitry 180 are completely contained within an outer enclosure (or wall) 191 of the body 192 so that they are hermetically sealed within the body 192 and do not directly contact the liquid in the chamber 115. The outer enclosure (wall) 191 of the body 192 can be made of plastic or other material suitable for contact with the liquid and resistant to degradation due to heat (e.g., heat generated by the one or more heating elements 140). The module 190 can be hand washed after use, or can be cleaned in a dishwasher, along with the vessel 102.

One or more passages 196 are optionally defined between the rim 195 and the body 192 (e.g., defined about at least a portion of the circumference of the module 190 between the rim 195 and the body 192) to allow for flow of liquid to pass along flow path F and out of the vessel 102. In the embodiment shown in FIG. 1, liquid can flow through the one or more passages 196 along the flow path F and into the connector 197 for consumption by the user. Therefore, the module 190 can advantageously be left in place in the vessel 102 while the liquid in the chamber 115 is consumed so that the one or more heating elements 140 can optionally continue to heat the liquid in the chamber 115 while the liquid is consumed (e.g., while an infant or baby consumes heated milk in the vessel 102). Alternatively, the module 190 can be removed from within the chamber 115 and the cap 120 and connector 197 reattached to the vessel 102 before the liquid is consumed (e.g., by the infant or baby), such as in embodiments of the module 190 that exclude the passages 196.

FIGS. 3A-3D shows another embodiment of a heating unit assembly or module 190A. Some of the features of the module 190A are similar to features of the module 190 in FIG. 2. Accordingly, references numerals used to designate the various features of the module 190A are identical to those used for identifying the corresponding features of the module 190 in FIG. 2, except that an "A" has been added to the reference numeral. Therefore, the structure and description for the various features for the module 190 in FIG. 2 is understood to apply to the corresponding features of the module 190A in FIGS. 3A-3D, except as described below.

In the illustrated embodiment, the rim 195A is provided by an adaptor 200 having an opening 197A that removably receives a stem portion 194A of the body 192A. The stem portion 194A can couple to the adaptor 200 via one or more pins 191A that extend from a surface of the stem portion 194A and engage corresponding grooves or holes in the adaptor 200 that are accessed via the opening 197A. In one embodiment, the adaptor 200 and stem portion 194A can be coupled in a key-groove manner by twisting the adaptor 200 on the stem portion 194A to lock the adaptor 200 to the body 192A. In another embodiment, the adaptor 200 can be press fit onto the stem portion 194A. In one embodiment, the body 192A is optionally cylindrical. However, in other embodiments, the body 192A is not cylindrical, and can have other suitable shapes (e.g., an oval, square or rectangular transverse cross-section).

Advantageously, the adaptor 200 can be provided in a plurality of sizes (e.g., outer diameters) that can couple to a variety of containers (e.g., containers having openings of varying sizes, such as varying diameters). For example, a kit of adaptors 200 of various sizes (e.g., various outer diameters) can be used with a variety of containers. FIGS. 4A-5B show two separate vessels 102B, 102C of different heights and diameters (and different sized openings), to which the body 192A can be coupled via different sized adaptors 200 (e.g., adaptors having a different outer diameter). Accordingly, a user can advantageously use preexisting containers (e.g., preexisting baby bottle, sippy cup, travel mug, soup container, thermos container, water bottle, such as reusable water bottle) already in their possession (e.g., in their kitchen cabinet), select an adaptor 200 sized to fit on the top opening of the container, attach the adaptor 200 to the body 192A and insert the module 190A into the container to heat (or cool) the liquid in the container. Accordingly, the modularity of the module 190A provided by the different sized adaptors 200 advantageously allows the user to use the module 190A with containers from different manufacturers, and allows users to use the module 190A with their preferred container (e.g., preferred baby bottle design, preferred sippy cup design, preferred travel mug design, etc.). Additionally, as discussed above, the module 190A remains in the container during use, while the user is consuming the liquid in the container, which allows the module 190A to continue to heat (or cool, where the module 190A includes a cooling unit) the liquid in the container as it's consumed (i.e., without having to remove the module 190A from the container before consuming the contents of the container). In another embodiment, the module 190A can be removed from within the chamber 115A and the cap 120A and connector 197A reattached to the vessel 102B, 102C before the liquid is consumed (e.g., by the infant or baby), such as in embodiments of the adaptor 200 excludes the passages 196A.

Figure 6:
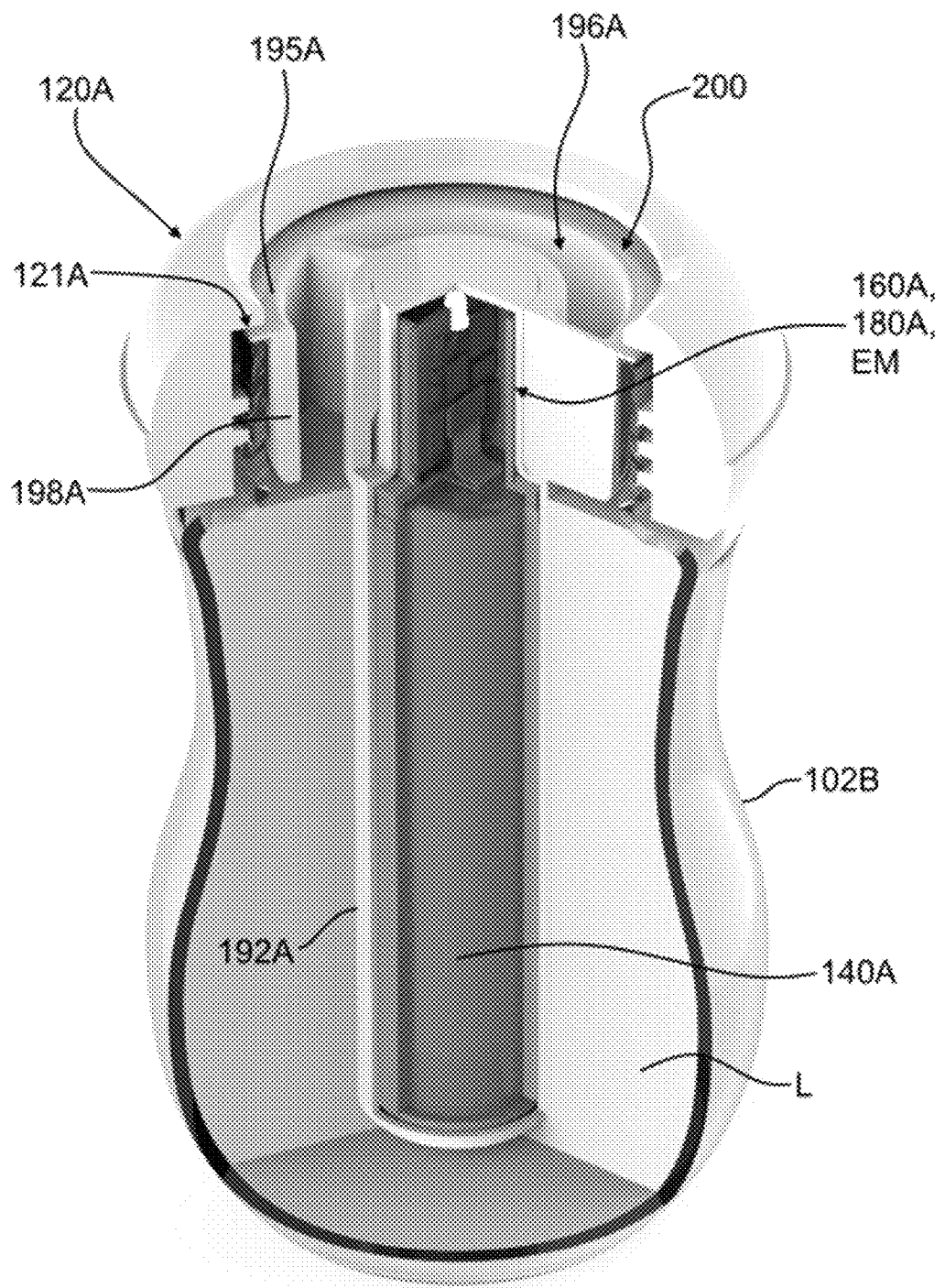
FIG. 6 shows a partial cross-sectional view of the removable heating unit assembly disposed in an embodiment of a container.
Figure 7:
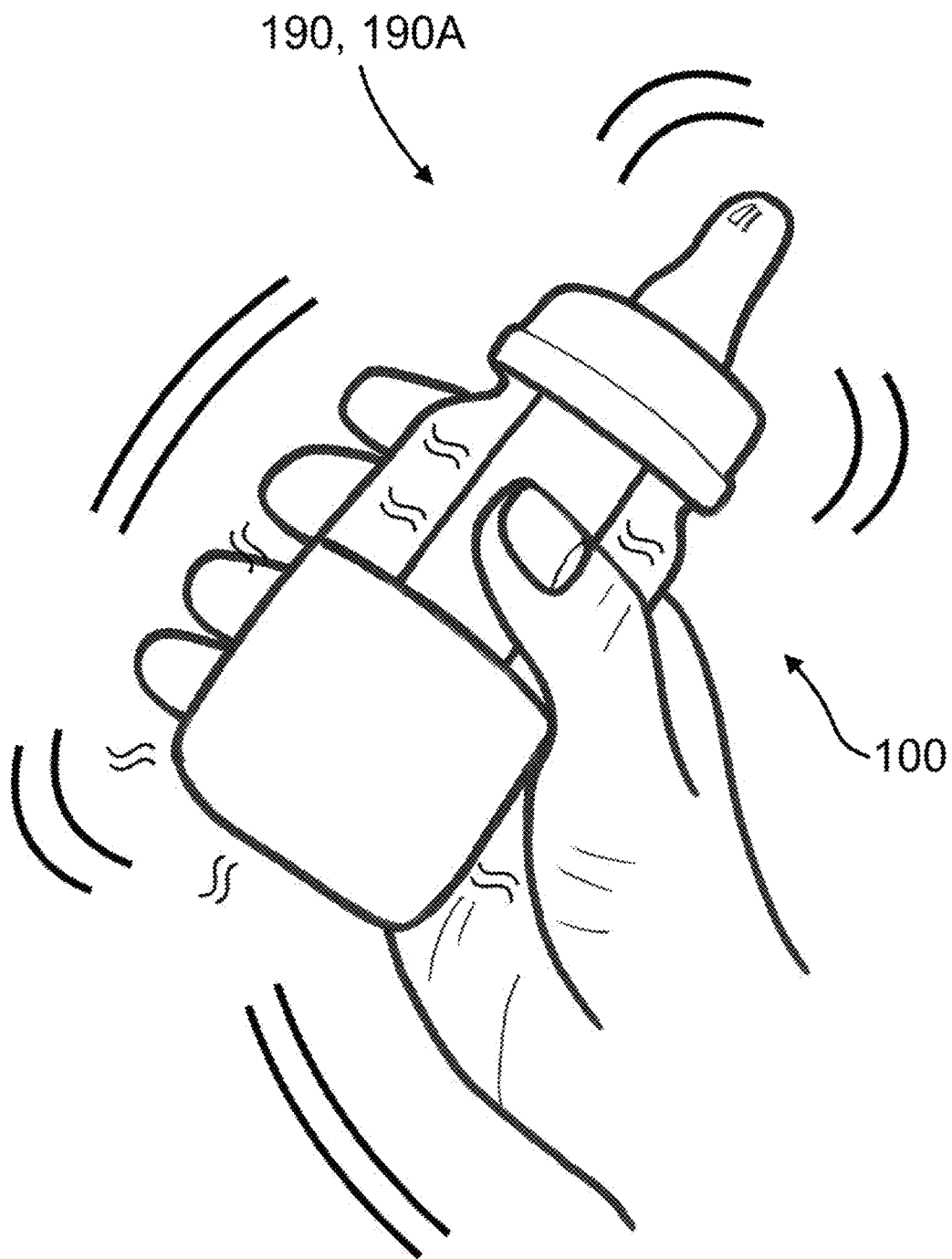
FIG. 7 shows a shaking motion of a drinkware container with the removable heating unit assembly disposed therein to cause an operation of the heating unit.

FIG. 6 shows a partial cross-sectional view of the vessel 102B with a liquid L therein and the module 190A disposed in the vessel 102B so that the surface of the body 192A is in contact with the liquid L along 360 degrees of the body 192A, such that heat transfer between the one or more heating elements 140A (or cooling elements or heating/cooling elements) can occur along the entire circumference of the body 192A, which can result in more uniform heating (or cooling) of the liquid L. In the illustrated embodiment, the body 192A extends along a central axis (e.g., axis of symmetry) of the vessel 102B. As shown in FIG. 6, the adaptor 200 is coupled to the body 192A and disposed in the vessel 102B so that a wall 198A of the adaptor 200 is adjacent an inner wall of the opening in the vessel 102B and so the rim 195A of the adaptor 200 rests on top of the rim of the opening of the vessel 102B. A cap or cover 120A can be attached to the vessel 102B (e.g., threadably attached to the vessel 102B) so that a shoulder 121A of the cover 120A contacts the rim 195A of the adaptor 200. One or both of the rim 195A and wall 198A of the adaptor 200 facilitate the sealing of the adaptor 200 to the opening of the vessel 102B so that the liquid L flows through the passages 196A in the adaptor 200. In another embodiment, the passages 196A are excluded from the adaptor 200. In the illustrated embodiment, the electronics (e.g., power storage elements 160A, control circuitry 180A) are disposed in the stem portion 194A of the body 192A. As discussed previously, the one or more heating elements 140A (or cooling elements or heating/cooling elements), control circuitry 180A and power storage elements 160A are sealed (e.g., hermetically sealed) within the body 192A of the module 190A such that they are isolated from contact with the liquid L.

In one embodiment, the module 190, 190A can communicate wirelessly with a remote electronic device ED (e.g., a mobile electronic device such as a mobile phone, PDA, tablet computer, laptop computer, electronic watch; or a desktop computer) via the cloud CL or via a wireless communication system such as Bluetooth BT, Wi-Fi, Zigbee, IR or RF communication. For example, the control circuitry 180, 180A can include a communication transceiver that allows the module 190, 190A to send information to the remote electronic device, as well as to receive information and/or instructions from the remote electronic device. For example, the module 190, 190A can communicate sensed temperature and sensed liquid level information or other information (e.g., frequency of use, for example to keep track of how often a baby drinks from a bottle fitted with the module 190, 190A, time of feedings, etc.) to the electronic device. In one embodiment, a user can control the temperature set point, increase or decrease or turn on or turn off power to the module 190, 190A to adjust the heat output by the module 190, 190A to the liquid via the remote electronic device. In one embodiment, data collection is triggered when the module 190, 190A is turned on.

As discussed above, the module 190, 190A can have one or more sensors 193, which can include a capacitance sensor. In one embodiment, the control circuitry 180 can control operation of the one or more heating elements 140, 140A (or cooling elements as described above) based on the sensed capacitance provided by the capacitance sensor to turn on power to the one or more heating elements 140, 140A (or cooling elements) when the sensed capacitance is consistent with the module 190, 190A being at least partially submerged in a liquid. This advantageously ensures that power to the module 190, 190A is not turned on when it is not disposed in a liquid (e.g., while the module 190, 190A is out of the vessel 102, 102B, 102C, when being held by the user, while on a charging module, as discussed below, etc.).

Additionally, or alternatively, power to the one or more heating elements 140, 140A of the module 190, 190A can be turned on once in place within the vessel 102, 102B, 102C with the cap or lid 120, 120A in place (e.g., as shown in FIGS. 1, 6) by vigorously shaking the vessel 102, 102B, 102C. For example, as discussed above, the one or more sensors 193 in the module 190, 190A can include an accelerometer and/or a gyroscope, which can sense an acceleration of the vessel 102, 102B, 102C during said vigorous shaking (i.e., an acceleration that is above a threshold value), and once the threshold acceleration is reached, the sensor can communicate a signal to the control circuitry 180, 180A, which would then provide control the one or more heating elements 140, 140A to being the heating process of the liquid in the vessel 102, 102B, 102C. This advantageously can prevent power to the module 190, 190A is not turned on when it is exposed to liquid (e.g., while being washed) but is not disposed in the vessel 102, 102B, 102C.

Additionally or alternatively, the one or more interchangeable adaptors 200 can optionally each have a magnet embedded therein that provides a magnetic switch (or reed switch) when the adaptor 200 is coupled to the stem portion 194A of the body 192A to thus allow power to the one or more elements 140A to heat (or cool) the liquid in the vessel 102, 102B, 102C. This advantageously can prevent power to the module 190A when the adaptor 200 is not coupled to the body 192A of the module 190A, such as when the user is holding the module 190A in their hand prior to coupling the adaptor 200 to it and inserting the module into the vessel 102, 102B, 102C. In one embodiment, once the adaptor 200 is attached to the body 192A, power to the one or more elements 140A can flow after a predetermined time (e.g., after a timer of the control circuitry 180, 180A registers that a certain amount of time has transpired).

In one embodiment, the module 190, 190A can have a visual indicator 300, such as a hidden-till-lit LED, at the top of the body 192, 192A that will illuminate (e.g., glow) once the heating (or cooling) cycle is activated. Once power of the one or more power storage elements 160, 160A drops below a predetermined amount, the warming (or cooling) cycle can be switched off (e.g., the control circuitry 180, 180A can control the operation of the one or more elements 140, 140A to cease the warming, or cooling, operation, such as by switching off power to the one or more elements 140, 140A). Additionally or alternatively, once a predetermined amount of time has transpired since the beginning of the warming (or cooling) cycle, the warming cycle can be switched off (e.g., by the control circuitry 180), as described above. In embodiments where the one or more elements 140, 140A are a phase change material (PCM), the warming or cooling cycle can cease once equilibrium in temperature between the PCM and the liquid L is reached.

In one embodiment, the operation of the module 190, 190A can automatically adjust (via the control circuitry 180, 180A) based at least in part on the sensed liquid level in the vessel 102, 102B, 102C. For example, as liquid level drops in the vessel 102, 102B, 102C, the control circuitry can adjust the amount of heat (or cooling) provided by the module 190, 190A to the liquid in the vessel 102, 102B, 102C.

Figure 8:
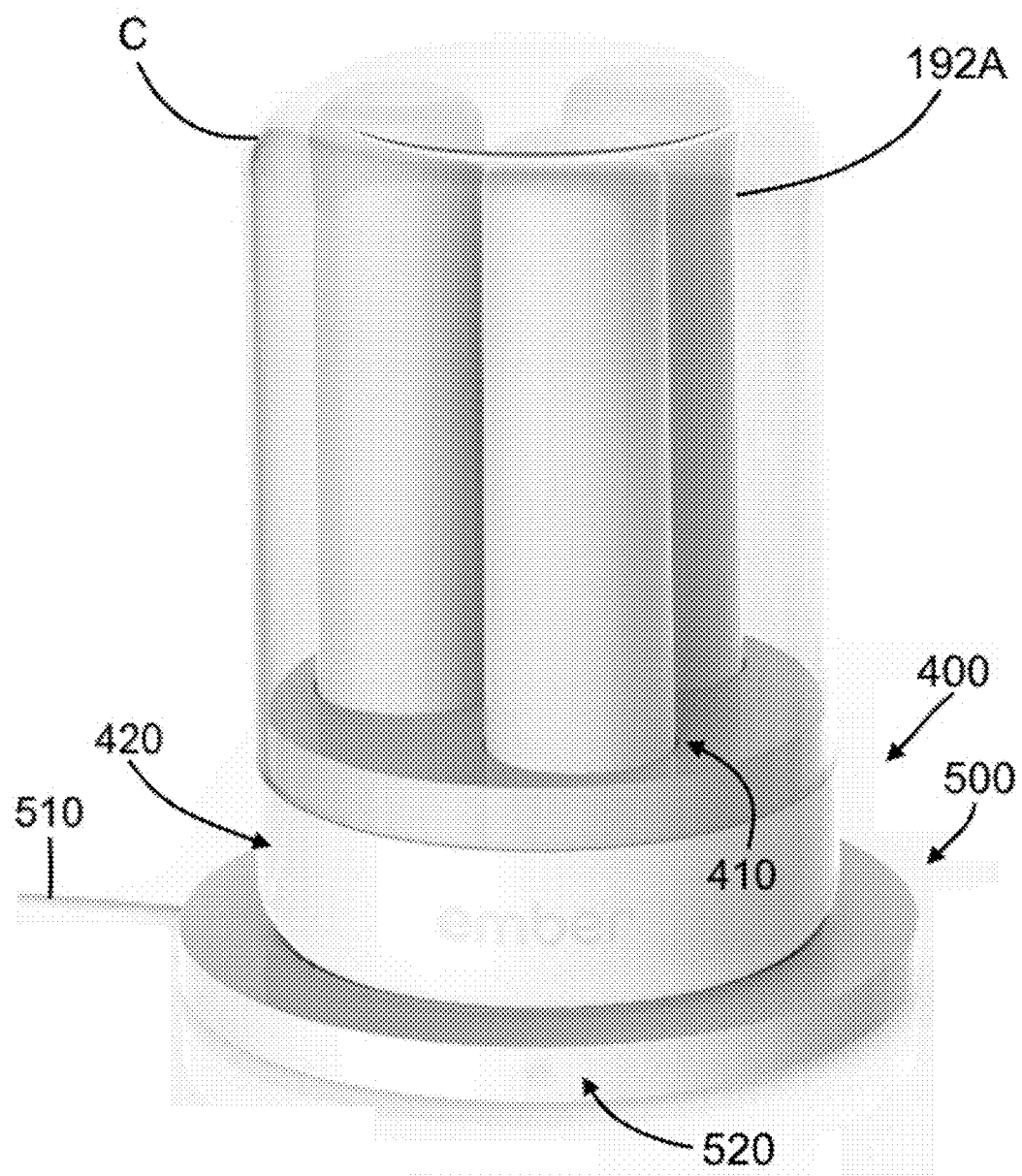
FIG. 8 shows a front perspective view of one embodiment of a storage unit for a plurality of heating units, and one embodiment of a charging base for the storage unit.

FIG. 8 shows one embodiment of a storage unit 400 to which a plurality of module bodies 192A can couple, facilitating the carrying of multiple module bodies 192A for later use (e.g., for use in heating liquid in a baby bottle during the day, or while traveling). In the illustrated embodiment, the storage unit 400 has three module bodies 192A coupled to it; however, in other embodiments the storage unit 400 can receive more or fewer module bodies 192A. The storage unit 400 can have an opening 410 through which the stem portion 194A of each module body 192A can be received. In one embodiment, the openings 410 of the storage unit 400 can optionally include a magnet that (like the adaptor 200 described above) provides a magnetic switch (or reed switch) when the stem portion 194A of the module body 192A is inserted therein. Such a magnetic switch can allow the electronics 420 in the storage unit 400 to communicate with the electronics (e.g., control circuitry 180A) in the module body 192A. In one embodiment, the electronics 420 can include charging circuitry for control and/or monitor the charging of the one or more power storage elements 160, 160A. The electronics 420 can optionally include a transceiver that allows the storage unit 400 to send information to the remote electronic device, as well as to receive information and/or instructions from the remote electronic device. For example, the storage unit 400 can communicate charging level information, time remaining for full charge, for the one or more module bodies 192A on the storage unit 400 to the electronic device. In one embodiment, data collection is triggered when the module body 192, 192A is coupled to the storage unit 400 (e.g., when the magnetic switch is closed).

In one embodiment, the storage unit 400 can optionally have an electrical connector on its bottom surface that interfaces with a corresponding electrical connector on a charging base 500 to thereby communicate power from the charging base 500 to the storage unit 400, and thereby to the one or more module bodies 192, 192A (e.g., to charge the one or more power storage elements 160, 160A). The charging base 500 can have a power cord 510 with a connector (not shown) that can couple to an electrical power source (not shown). The connector can be a USB connector, which can then connect to existing connectors (e.g., a pronged connector of an iPhone charger) to couple to a wall outlet. In another embodiment, the connector can be a pronged wall power connector or a connector that can couple to a cigarette lighter unit in an automobile. The charging base 500 can have an indicator 520 (e.g., a visual indicator, such as an LED light) that can illuminate while the charging process is taking place (e.g., while power is flowing to the storage unit 400 via the charging base 500). In another embodiment, the electrical contacts between the storage unit 400 and charging base 500 can be excluded, and power can be transferred from the charging base 500 to the storage unit 400 via induction (e.g., the storage unit 400 and charging base 500 can have components that provide an induction circuit) to allow for wireless charging. Similarly, as the one or more module bodies 192, 192A are sealed, the one or more power storage elements 160, 160A therein are charged wirelessly (e.g., charged via induction by an induction circuit formed by components in the storage unit 400 and module bodies 192, 192A).

In one embodiment, operational settings for the one or more module bodies 192, 192A can be reset when on the storage unit 400, such as once the magnetic switch is closed and the charging operation begins (e.g., once the storage unit 400 is disposed on the charging base 500).

Figure 9:
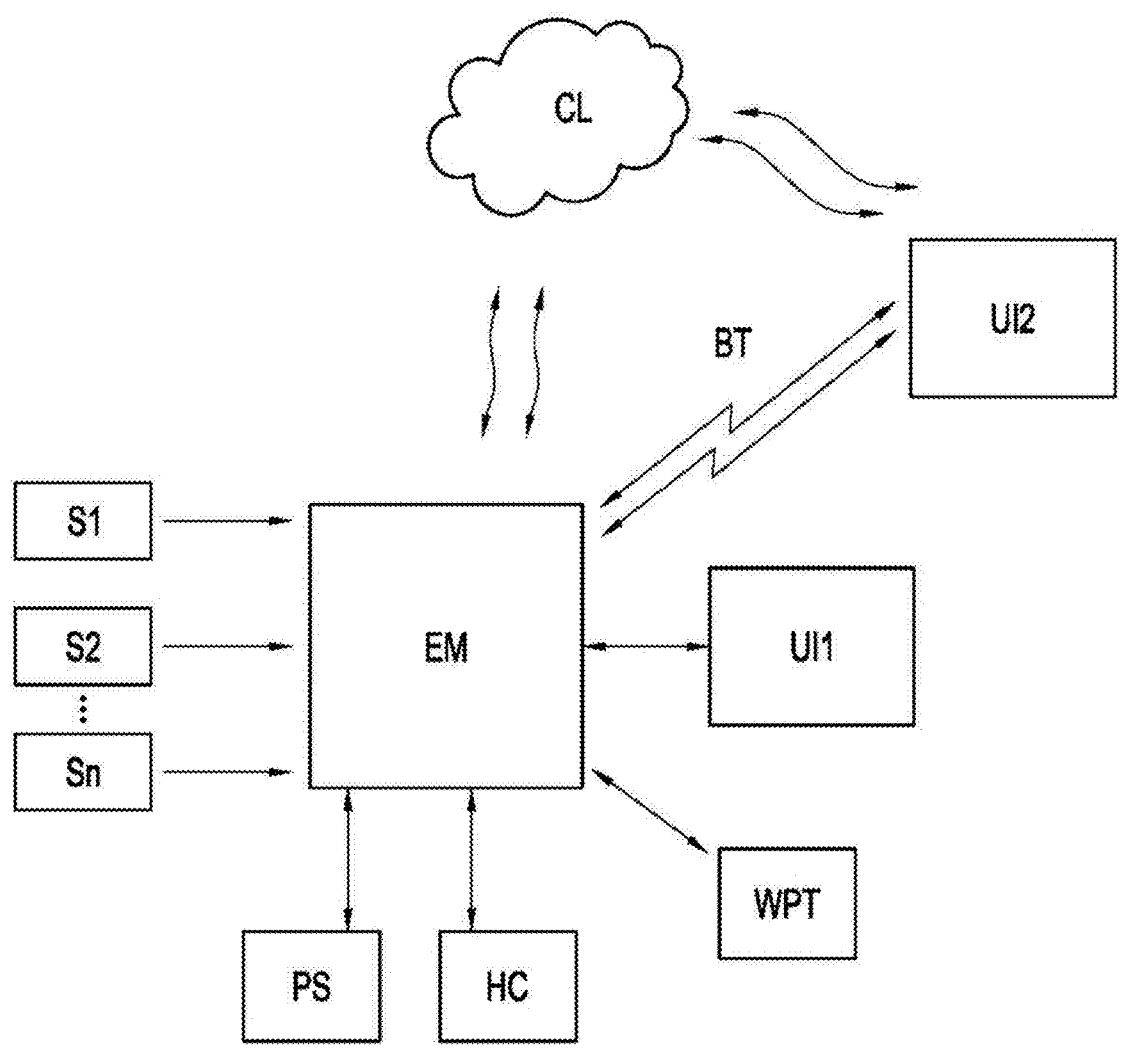
FIG. 9 is a schematic block diagram showing communication between an electronic module of the heating unit of FIGS. 2-3D and a remote electronic device.

FIG. 9 above shows a block diagram of a communication system for any of the modules 190, 190A of the containers described herein. In the illustrated embodiment, the electronic module EM (such as the electronic module disclosed herein for the module 190, 190A), which can include the control circuitry 180, 180A, can receive sensed information from one or more sensors S1-Sn (e.g., liquid level sensors, liquid volume sensors, temperature sensors, battery charge sensors, capacitance sensors, tilt sensors or gyroscopes), which can include the sensor 193, 193A. The electronic module EM can also receive information from and transmit information (e.g., instructions) to one or more heating elements (or cooling elements or heating/cooling elements) HC, such as the elements 140, 140A (e.g., to operate each of the heating elements in a heating mode, turn off, turn on, vary power output of, etc.) and optionally to one or more power storage devices PS, such as the power storage elements 160, 160A (e.g., batteries, such as to charge the batteries or manage the power provided by the batteries to the one or more heating or cooling elements). The electronic module EM can also communicate with a wireless power transmitter WPT (e.g., an inductive power transmitter) optionally on the module 190, 190A. The electronic module EM can also communicate with (e.g., transmit information to and receive information, such as user instructions from) a user interface UI1 on the module 190, 190A (e.g., on the body of the module 190, 190A). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as Bluetooth BT. The electronic device ED can have a user interface UI2, that can display information associated with the operation of the module 190, 190A (as disclosed herein), and that can receive information (e.g., instructions) from a user and communicate said information to the module 190, 190A (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the module 190, 190A, as disclosed herein. That is, the electronic module or electronics can have different form factors.

Sensors

With respect to any of the containers disclosed above, one or more sensors S1-Sn can be provided. In some embodiments, at least one sensor S2 of the one or more sensors S1-Sn can sense a liquid level (or information indicative of a liquid level) in a chamber 115 of the vessel 102.

In one embodiment, the sensor S2 can be a load cell that can sense a weight of the container 100 (e.g., when tipped upside down). The electronic module EM of the container can receive the sensed weight information and compare it against a reference weight data (e.g., previously sensed when the container was empty and/or that is stored in a memory of the electronic module EM), and calculate a volume or level of the liquid in the container 100 (e.g., using an algorithm to convert the sensed weight information to liquid volume or level measurement).

In another embodiment, the sensor S2 can be a pressure sensor on a portion of the chamber 115 of the container 100 and can sense a hydrostatic pressure of the liquid in the chamber 115 (e.g., when tipped upside down). The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of a sidewall of the body 192, 192A. The sensor S2 can sense a capacitance of a liquid in the container 100 relative to a capacitance of air above the liquid level and communicate the sensed information to the electronic module EM, which can provide a measurement of liquid volume or liquid level in the container 100 based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on a sidewall of the body 192, 192A. The sensor S2 can use a pulse-echo or wall resonance (e.g. resonance of the sidewall of the body 192, 192A) to sense information indicative of a liquid level in the container. For example, the sensor S2 can sense a time it takes for pulse emitted by the sensor S2 into the chamber 115 of the container 100 to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor (e.g., gyroscope). The sensor S2 can sense an orientation (or change in orientation) of the container 100 and communicate the sensed orientation information to the electronic module EM. The electronic module EM can estimate a liquid level in the container 100 based on the sensed orientation information (e.g., using an algorithm that correlates a tilt angle to a liquid level). For example, if the sensor S2 senses an orientation of less than a first threshold (e.g., less than 30 degrees from an upright position) when a user has the container against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, liquid level in the container 100 is measured based on sensed temperature (or information indicative of temperature) from one or more (e.g., a plurality of) temperature sensors S3. In one embodiment, the one or more sensors S3 can sense how long it takes the temperature to increase a reference number of degrees (e.g., 1 degree F. or 1 degree C.) when the chamber 115 of the container 100 is full of liquid to provide a first reference time, and the first reference time can be stored in a memory (e.g., a memory of the electronic module EM). Optionally, additional reference times can be provided by the one or more sensors S3 when the chamber 115 of the container 100 has other volumes of liquid therein (e.g., half full, ¾ full) and the reference times stored in said memory. During operation of the container, the one or more temperature sensors S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times. Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the one or more temperature sensor S3 therefore advantageously allows measurement of temperature and liquid level in the container with one sensor instead of requiring a separate sensor to measure liquid level, which provides for a simpler and less costly system. In another embodiment, the module 190, 190A can have a plurality of temperature sensors S3 along the length of the body 192, 192A and the liquid level in the chamber 115 of the container 100 can be determined by the electronic module EM by comparing the sensed temperature readings from the plurality of temperature sensors S3 (e.g., estimating that the liquid level is at a location between two adjacent temperature sensors where the temperature readings from said adjacent temperature sensors vary by more than a certain amount).

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are in describe for drinkware containers, the features are applicable to containers that are not drinkware containers (e.g., bowls, serverware, food storage containers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the features and ideas disclosed above may be related to actively heating or cooling food or beverage, the embodiments above may also be used to heat or cool air spaces, such as refrigeration devices, cold boxes, coolers, portable coolers, or portable refrigerators, or hot boxes, or warmer drawers, or heat chambers, or any other device that would benefit from the heating or cooling of the air within a defined cavity or chamber.

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the container, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed heated or cooled dishware, drinkware and/or serverware.

What is claimed is:

1. A module for adjusting a temperature of a liquid in a container, comprising:

an elongate portion sized for insertion into a container configured to hold a liquid, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container; and an adaptor removably coupleable to a proximal end of the elongate portion, the adaptor having an inner circumferential wall that defines a central opening of the adaptor into which the proximal end of the elongate portion at least partially extends when coupled to the adaptor so that the inner circumferential wall is disposed about an outer circumferential wall of the elongate portion, the adaptor further comprising an outer circumferential wall spaced apart from the inner circumferential wall so as to define one or more passages therebetween that extend linearly along an entire length of the adaptor and that allow a fluid to pass therethrough, the adaptor further comprising a rim at a proximal end of the outer circumferential wall, the rim extending radially outward from the outer circumferential wall, wherein the adaptor is configured to couple to an opening of the container such that the rim of the adaptor contacts a rim of the container that defines the opening of the container and so that the outer circumferential wall of the adaptor is disposed in the opening of the container against an inner wall of the container that defines the opening of the container so that the elongate portion extends into the container so that at least a portion of the elongate portion is submerged in the liquid in the container, the one or more passages configured to allow the liquid to exit the vessel while the module is disposed in the container, thereby allowing a user to consume the liquid in the container while the module is disposed in the container.

2. The module of claim 1, wherein the adaptor comprises a plurality of adaptors of varying outer circumferences, each being removably coupleable to the proximal end of the elongate portion and configured to fit a plurality of containers having openings of varying outer circumferences.

3. The module of claim 1, wherein the elongate portion further comprises control circuitry configured to control the operation of the one or more heating or cooling elements.

4. The module of claim 3, wherein the elongate portion further comprises one or more power storage devices configured to deliver power to one or both of the control circuitry and one or more heating or cooling elements.

5. The module of claim 3, wherein the elongate portion comprises one or more sensors configured to sense a parameter of the liquid in the container, the control circuitry configured to operate the one or more heating or cooling elements based at least in part on the sensed parameter.

6. The module of claim 1, wherein the elongate portion further comprises a transceiver configured to transmit information to, and receive information from, a remote electronic device.

7. The module of claim 1, wherein the one or more heating or cooling elements comprise a resistive heater operable to heat the liquid in the container.

8. The module of claim 1, wherein the elongate portion is hermetically sealed.

9. In combination, a container configured to hold a liquid and a module for adjusting a temperature of a liquid in a container, the module comprising:
   an elongate portion sized for insertion into the container such that the elongate portion is suspended in a cavity of the container, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container; and
   an adaptor removably coupleable to a proximal end of the elongate portion, the adaptor having an inner circumferential wall that defines a central opening of the adaptor into which the proximal end of the elongate portion at least partially extends when coupled to the adaptor so that the inner circumferential wall is disposed about an outer circumferential wall of the elongate portion, the adaptor further comprising an outer circumferential wall spaced apart from the inner circumferential wall so as to define one or more passages therebetween that extend linearly along an entire length of the adaptor and that allow a fluid to pass therethrough, the adaptor further comprising a rim at a proximal end of the outer circumferential wall, the rim extending radially outward from the outer circumferential wall,
   wherein the adaptor is configured to couple to an opening of the container such that the rim of the adaptor contacts a rim of the container that defines the opening of the container and so that the outer circumferential wall of the adaptor is disposed in the opening of the container against an inner wall of the container that defines the opening of the container so that the elongate portion extends into the container so that at least a portion of the elongate portion is submerged in the liquid in the container, the one or more passages configured to allow the liquid to exit the vessel while the module is disposed in the container, thereby allowing a user to consume the liquid in the container while the module is disposed in the container.

10. The combination of claim 9, wherein the adaptor comprises a plurality of adaptors of varying outer circumferences, each being removably coupleable to the proximal end of the elongate portion and configured to fit a plurality of containers having openings of varying outer circumferences.

11. The combination of claim 9, wherein the elongate portion further comprises control circuitry configured to control the operation of the one or more heating or cooling elements.

12. The combination of claim 11, wherein the elongate portion further comprises one or more power storage devices configured to deliver power to one or both of the control circuitry and one or more heating or cooling elements.

13. The combination of claim 11, wherein the elongate portion comprises one or more sensors configured to sense a parameter of the liquid in the container, the control circuitry configured to operate the one or more heating or cooling elements based at least in part on the sensed parameter.

14. The combination of claim 9, wherein the elongate portion further comprises a transceiver configured to transmit information to, and receive information from, a remote electronic device.

15. The combination of claim 9, wherein the one or more heating or cooling elements comprise a resistive heater operable to heat the liquid in the container.

16. The combination of claim 9, wherein the elongate portion is hermetically sealed.

17. The combination of claim 9, wherein the container is a baby bottle.

18. A kit for heating or cooling a liquid in a container, comprising:
   an elongate portion sized for insertion into a container, the elongate portion having an outer surface configured to contact the liquid in the container about the circumference of the elongate portion, the elongate portion housing therein one or more heating or cooling elements configured to facilitate heat transfer between at least a portion of the elongate portion and the liquid in the container; and
   one or more adaptors removably coupleable to a proximal end of the elongate portion, the adaptor having an inner circumferential wall that defines a central opening of the adaptor into which the proximal end of the elongate portion at least partially extends when coupled to the adaptor so that the inner circumferential wall is disposed about an outer circumferential wall of the elongate portion, the adaptor further comprising an outer circumferential wall spaced apart from the inner circumferential wall so as to define one or more passages therebetween that extend linearly along an entire length of the adaptor and that allow a fluid to pass therethrough, the adaptor further comprising a rim at a proximal end of the outer circumferential wall, the rim extending radially outward from the outer circumferential wall and configured to contact a rim of the container that defines the opening of the container and so that the outer circumferential wall of the adaptor is disposed in the opening of the container against an inner wall of the container that defines the opening of the container, the adaptor allowing the liquid in the container to exit via said one or more passages while the elongate portion is disposed in the container during consumption of the liquid by the user.

19. The kit of claim 18, wherein the one or more adaptors comprises a plurality of adaptors of varying outer circumferences, each being removably coupleable to the proximal end of the elongate portion and configured to fit a plurality of containers having openings of varying outer circumferences.

20. The kit of claim 18, wherein the elongate portion further comprises control circuitry configured to control the operation of the one or more heating or cooling elements.

21. The kit of claim 20, wherein the elongate portion further comprises one or more power storage devices configured to deliver power to one or both of the control circuitry and one or more heating or cooling elements.

22. The kit of claim 20, wherein the elongate portion comprises one or more sensors configured to sense a parameter of the liquid in the container, the control circuitry configured to operate the one or more heating or cooling elements based at least in part on the sensed parameter.

23. The kit of claim 18, wherein the elongate portion further comprises a transceiver configured to transmit information to, and receive information from, a remote electronic device.

24. The kit of claim 18, further comprising a storage unit configured to removably receive at least a portion of the elongate portion therein, the storage unit comprising electronics configured to control one or more operating functions of the elongate portion.

25. The kit of claim 24, wherein the electronics are configured to control a charging operation of one or more power storage elements in the elongate portion.

26. The kit of claim 24, wherein the electronics are configured to control a reset operation of software stored in the elongate portion for operation of the one or more heating or cooling elements.

27. The kit of claim 24, wherein the storage unit comprises one or more electrical contacts through which the storage unit receives power.

28. The kit of claim 24, further comprising a charging base configured to receive at least a portion of the storage unit thereof, the charging base configured to receive power from a power source and to transmit power to the storage unit while the storage unit is disposed on the charging base.

29. The kit of claim 28, wherein the charging base comprises one or more electrical contacts configured to contact one more electrical contacts on a surface of the storage unit, the charging base configured to transmit power to the storage unit via the one or more electrical contacts on the charging base and storage unit.

* * * * *